US010521892B2

(12) United States Patent
Sunkavalli et al.

(10) Patent No.: US 10,521,892 B2
(45) Date of Patent: Dec. 31, 2019

(54) IMAGE LIGHTING TRANSFER VIA MULTI-DIMENSIONAL HISTOGRAM MATCHING

(71) Applicant: ADOBE INC., San Jose, CA (US)

(72) Inventors: Kalyan K. Sunkavalli, San Jose, CA (US); Sunil Hadap, Dublin, CA (US); Elya Shechtman, Seattle, WA (US); Zhixin Shu, Centereach, NY (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/253,655

(22) Filed: Aug. 31, 2016

(65) Prior Publication Data

US 2018/0061028 A1    Mar. 1, 2018

(51) Int. Cl.
*G06T 5/40* (2006.01)
*G06K 9/00* (2006.01)
*G06T 5/50* (2006.01)
*G06T 11/00* (2006.01)

(52) U.S. Cl.
CPC .............. *G06T 5/50* (2013.01); *G06T 11/00* (2013.01); *G06T 2207/10024* (2013.01)

(58) Field of Classification Search
CPC ........................... G06T 5/40; G06K 9/00248
See application file for complete search history.

(56) References Cited

U.S. PATENT DOCUMENTS

| 2003/0225633 | A1* | 12/2003 | Sidlo | G06F 21/10 |
| | | | | 705/26.8 |
| 2012/0170838 | A1* | 7/2012 | Wang | G06K 9/00771 |
| | | | | 382/165 |
| 2013/0015946 | A1* | 1/2013 | Lau | G07C 9/00 |
| | | | | 340/5.2 |
| 2013/0129158 | A1* | 5/2013 | Wang | G06K 9/00 |
| | | | | 382/118 |
| 2013/0287299 | A1* | 10/2013 | Huang | G06T 9/00 |
| | | | | 382/169 |

(Continued)

OTHER PUBLICATIONS

Chen, X., Chen, M., Jin, X., & Zhao, Q. (Jun. 2011). Face illumination transfer through edge-preserving filters. In Computer Vision and Pattern Recognition (CVPR), 2011 IEEE Conference on (pp. 281-287). IEEE.

(Continued)

*Primary Examiner* — Yi Yang
(74) *Attorney, Agent, or Firm* — Shook, Hardy and Bacon L.L.P.

(57) ABSTRACT

Embodiments of the present invention provide systems, methods, and computer storage media directed at relighting a target image based on a lighting effect from a reference image. In one embodiment, a target image and a reference image are received, the reference image includes a lighting effect desired to be applied to the target image. A lighting transfer is performed using color data and geometrical data associated with the reference image and color data and geometrical data associated with the target image. The lighting transfer causes generation of a relit image that corresponds with the target image having a lighting effect of the reference image. The relit image is provided for display to a user via one or more output devices. Other embodiments may be described and/or claimed.

19 Claims, 7 Drawing Sheets
(2 of 7 Drawing Sheet(s) Filed in Color)

(56) References Cited

U.S. PATENT DOCUMENTS

| | | | | |
|---|---|---|---|---|
| 2014/0337721 A1* | 11/2014 | Shechtman | ............. | G06T 13/80 |
| | | | | 715/273 |
| 2015/0302240 A1* | 10/2015 | Rao | ................... | G06K 9/00248 |
| | | | | 382/201 |
| 2016/0379041 A1* | 12/2016 | Rhee | ................. | G06K 9/00208 |
| | | | | 382/118 |

OTHER PUBLICATIONS

Pitie, F., Kokaram, A. C., & Dahyot, R. (Oct. 2005). N-dimensional probability density function transfer and its application to color transfer. In Computer Vision, 2005. ICCV 2005. Tenth IEEE International Conference on (vol. 2, pp. 1434-1439). IEEE.

Shih, Y., Paris, S., Barnes, C., Freeman, W. T., & Durand, F. (2014). Style transfer for headshot portraits.

Wen, Z., Liu, Z., & Huang, T. S. (Jun. 2003). Face relighting with radiance environment maps. In Computer Vision and Pattern Recognition, 2003. Proceedings. 2003 IEEE Computer Society Conference on (vol. 2, pp. II-158). IEEE.

Yang, F., Wang, J., Shechtman, E., Bourdev, L., & Metaxas, D. (Aug. 2011). Expression flow for 3D-aware face component transfer. In ACM Transactions on Graphics (TOG) (vol. 30, No. 4, p. 60). ACM.

\* cited by examiner

IMAGE LIGHTING TRANSFER VIA MULTI-DIMENSIONAL HISTOGRAM MATCHING

BACKGROUND

Digital image editing has become increasingly more popular as digital image capture devices have become somewhat ubiquitous. An individual, for instance, may carry a mobile phone, dedicated camera, or the like that the individual can utilize to capture digital images of objects (e.g., landscape, room, sporting event, individuals, etc.) that are of interest. In some instances, these digital images do not capture the scene as desired. In such instances, digital image editing techniques can be employed to modify the digital image to achieve a desired result. One of these digital image editing techniques that is commonly used attempts to relight an image to achieve a desired effect. Conventional relighting techniques, however, are inadequate to achieve a realistic result. This is especially the case with respect to portraits because of the intricacies involved in relighting an object (e.g., a face) in a realistic manner.

Some conventional relighting techniques for portraits attempt to estimate facial geometry, lighting, and reflectance of a face in an image to re-render the face with a desired lighting effect. In these re-rendering based relighting techniques, small errors in the estimated geometry, lighting, or reflectance can lead to artifacts in the resulting re-rendered image. These artifacts can cause the resulting re-rendered image to fail at achieving the desired lighting effect and can also cause the resulting image to appear unrealistic. As such, accuracy in calculating the estimated facial geometry, lighting, and reflectance is important to such techniques. However, increased accuracy can be computationally intensive and cannot fully eliminate these small errors. Consequently, a realistic resulting image can be very difficult to achieve.

Other conventional relighting techniques are filter based and rely on the application of various filters to the image to generate the relit image. Filter-based relighting techniques, however, fail to take into account positional information of the face being relit and, therefore, also often produce unrealistic results.

SUMMARY

Embodiments of the present invention are directed towards portrait relighting techniques that can transfer a desired lighting effect from one image, a reference image, to another image, a target image, to produce a realistic relit image. To accomplish this, the relighting technique performs a geometry-based transfer of lighting from a reference image to a target image. The geometry-based transfer of the lighting can utilize both geometrical data for an object(s) (e.g., a facial region) within the reference image and the target image and corresponding color data from the reference image and the target image. Because the transfer of the lighting is geometry-based, the resulting re-lit image can be more realistic than the conventional filter-based relighting techniques. In addition, because the relighting technique involves the transfer of lighting from the reference image to the target image, there is no need for re-rendering of any aspects of the image, resulting in a more realistic image than the re-rendering based relighting techniques.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The lighting within captured photos is oftentimes not the desired lighting. As such, digital editing techniques are oftentimes applied to achieve a desired relighting. Obtaining a desired image relighting using conventional relighting techniques, however, can be difficult to achieve as well as computationally intensive. For example, utilizing filters for image relighting can produce unrealistic relighting results due to lack of utilization of three-dimensional data. Further, current three-dimensional techniques using estimated geometry, lighting, and reflectance components to re-render images can produce undesired relighting results due to errors in the estimated components.

As such, embodiments of the present invention are generally directed to image relighting techniques that transfer a desired lighting effect from one image, a reference image, to another image, a target image, to produce a realistic relit image. Stated differently, aspects of the invention are directed to editing the lighting in a target image to match the lighting in a reference image. A target image generally refers to an image to which a lighting effect is desired to be applied, while a reference image generally refers to an image having lighting desired to be applied to another image (a target image).

At a high level, to efficiently and effectively apply relighting to generate a desired relit image, three-dimensional geometrical data is used in combination with color data to transfer a lighting effect from the reference image to the target image. In particular, the relighting technique described herein performs a geometry-based transfer of lighting from the reference image to the target image. The geometry-based transfer of the lighting can use both geometrical data for objects (e.g., faces) within the reference image and the target image as well as corresponding color information from the reference image and the target image. Utilizing geometrical data in performing lighting transfer facilitates the capture of directional, or localized, nature of lighting (e.g., regions that are closer to a light may be brighter than regions that are further away, and regions that face a light may be brighter than those that face away). As described in more detail below, lighting transfer techniques using geometrical data in addition to color data are implemented utilizing histogram matching to transfer a lighting effect from one image to another.

Because the transfer of the lighting data is geometry-based, the resulting re-lit image can be more realistic than the conventional filter-based relighting techniques. Further, because the relighting technique involves the transfer of lighting data from the reference image to the target image, there is no need for re-rendering any aspects of the image, resulting in a more realistic image than the re-rendering based relighting techniques.

Figure 1:
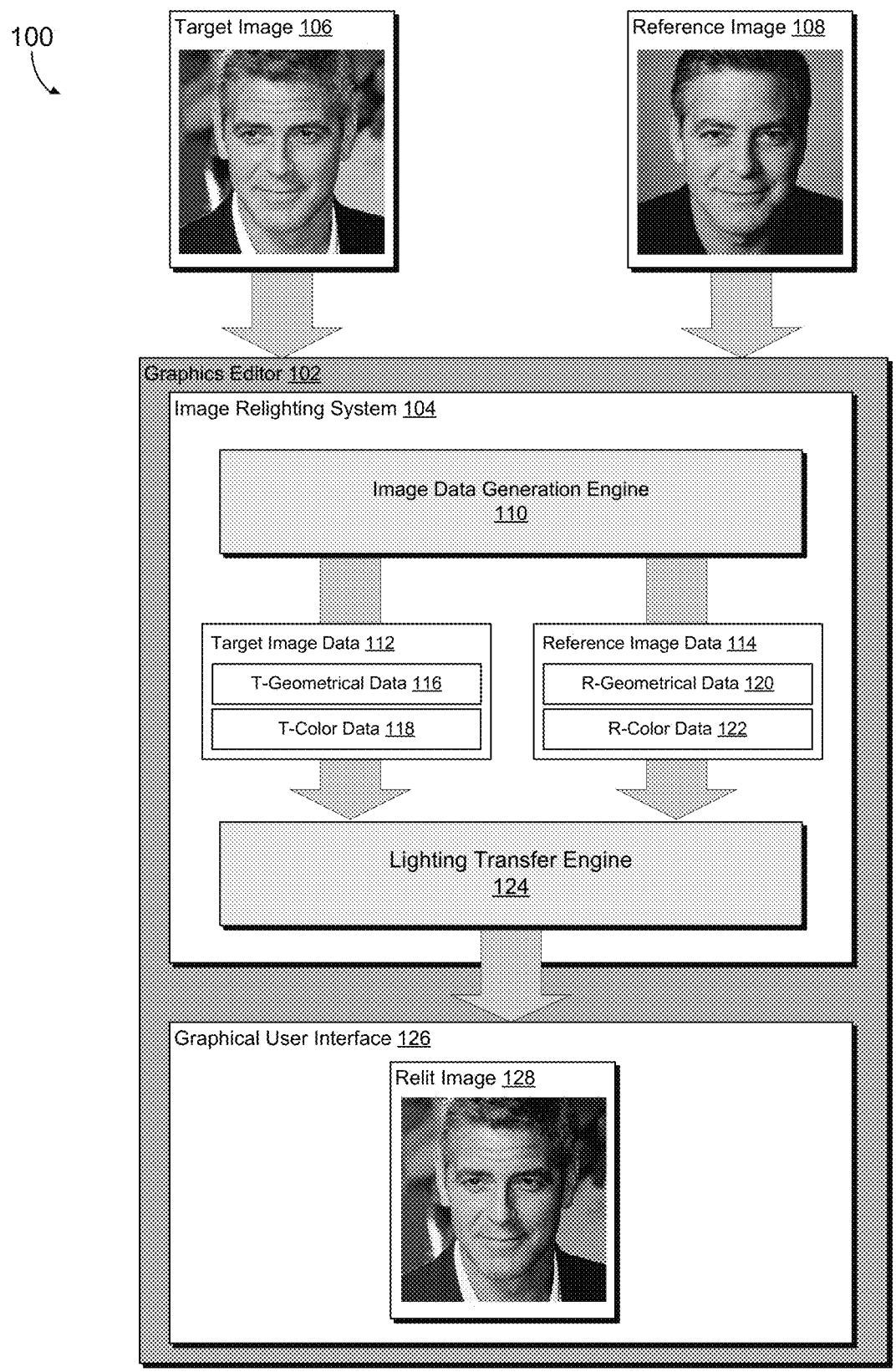
FIG. 1 depicts aspects of an illustrative graphics editing environment, in accordance with various embodiments of the present disclosure.

Turning initially to FIG. 1, FIG. 1 depicts aspects of an illustrative graphics editing environment 100 in accordance with various embodiments of the present disclosure. As depicted, graphics editing environment 100 includes a graphics editor 102. Graphics editor 102 can be any suitable graphics editor. Illustrative graphics editors include, for example, ADOBE® Illustrator or ADOBE® Photoshop (both available from Adobe Systems Inc. of San Jose, Calif.). Graphics editor 102 can be configured to provide, among other things, a user interface 126 that facilitates a user of graphics editor 102 in manipulating a digital image, such as, for example, target image 106. Graphics editor 102 can also be configured with an image relighting system 104. Generally, image relighting system 104 is configured to perform a relighting process that transfers a lighting effect from a selected reference image 108 to target image 106 to produce a relit image 128.

As illustrated, graphics editor 102 is configured to obtain target image 106 and reference image 108 as input (i.e., input images). Target image 106 and reference image 108 can be selected for input, for example, by a user via a graphical user interface, programmatically, or in any number of other ways. As previously described, a target image refers to an image to which a lighting effect is desired to be applied. A reference image generally refers to an image having lighting desired to be applied to another image (a target image).

In various embodiments, input digital images (target image(s) and/or reference image(s)) can be produced, or captured, by a digital image capture device. Such a digital image capture device could be, for example, a document scanner, a digital camera (video or still), or any other suitable digital image capture device. In other embodiments, input digital images may be produced entirely in the digital realm (e.g., computer generated imagery (CGI)). As can be appreciated, techniques described herein can be used to match or transfer lighting from other types of reference input, such as rendered three-dimensional models, a drawing, or user-edited images. For example, lighting can be transferred from a three-dimensional rendered image. To this end, a user might, for instance, create a rendering with a desired lighting (instead of photographing a subject under that lighting) and transfer lighting from the rendered image to a selected photograph. As another example, lighting can be transferred from an edited image (e.g., a coarsely edited image). In this regard, a user may scribble or draw shadows and brightly lit regions on an input image, and the edited image can be used to create a more realistically lit result.

Target image 106 and reference image 108 generally represent images that are stored in a digital format (e.g., JPEG, BMP, TIFF, PNG, GIF, etc.). Such images can be stored digitally as a two-dimensional array of pixels that depict the object(s) or scene captured by the respective digital image. The pixels are generally assigned certain information, such as, for instance, color data. Color data refers to data indicating color associated with a pixel(s). For example, in some embodiments, each pixel is assigned a value in the red, green, blue (RGB) color domain. The RGB color domain, also referred to in the art as the RGB color model, is an additive representation of a color. In the RGB color domain, each pixel would be assigned a color by assigning an amount of red, green, and blue to the respective pixel, hereinafter referred to as an RGB color value. The combination of this RGB color value represents the color of the pixel within the digital image. It will be appreciated that the RGB color domain is merely meant to be an example of a possible color domain and that the teachings of this disclosure could be applied to any color domain, or representation of color, without departing from the scope of this disclosure.

Although the target image(s) and reference image(s) generally discussed herein are digital portraits, or include a face or individual as an object in the image, embodiments of the present invention are not limited thereto. Further, the objects within the target image and reference image can be different from one another. For instance, a reference image can include an individual having a different pose, identity, gender, age, expression, accessory, hair, makeup, etc. as compared to an individual in the target image.

As illustrated in FIG. 1, the graphics editor 102 includes an image relighting system 104 and graphical user interface (GUI) 126. GUI 126 is configured to facilitate a user of graphics editor 102 in utilizing image relighting system 104 to generate a relit image, such as, for example, relit image 128. For instance, GUI 126 can be configured to enable a user to select target image 106 and/or reference image 108 from a file system in which these images have been stored. GUI 126 can also be configured to cause display of relit image 128 to a user of graphics editor 102 as well as enable the user to save, print, or otherwise output relit image 128.

To accomplish the relighting process described herein, image relighting system 104 can include an image data generation engine 110 and a lighting transfer engine 124. Although image data generation engine 110 and lighting transfer engine 124 are illustrated and described as separate components, the components can operate in any manner. For instance, the functionalities described herein can be performed by a single component or any other number of components or engines.

Image data generation engine 110 generally generates image data associated with input images. Image data refers to data associated with an image that can be used to transfer a lighting effect from one image to another. As described herein, the image data generation engine 110 generates or obtains color data and geometrical data (position data and orientation data). Color data can be generated or obtained for each pixel, or group of pixels, of the input images (a target image and a reference image). The generation of such color information can include extracting a color for each pixel, or group of pixels, within the image. In some embodiments, the extracted color information can be converted to another color space. Geometrical data can also be generated or obtained for each pixel, or group of pixels, of the input images. As described, geometrical data generally indicates position or surface orientation associated with a pixel(s). Such image data can be generated on a per pixel basis from the image and may be in any suitable color format, such as, for example, RGB, and positional format, such as, for instance, pixel coordinate location. Further, image data might be generated for each pixel in the image, or alternatively, for a portion of the image (e.g., pixels corresponding with a three-dimensional mask or an object, such as a face, in the image).

By way of example only, and with reference to FIG. 1, the image data generation engine 110 can generate target image data 112 in association with the target image 106. The target image data 112 includes geometrical data 116 and color data 118 associated with the target image. The image data generation engine 110 can also generate reference image data 114 in association with the reference image 108. The reference image data 108 includes geometrical data 120 and color data 122 associated with the reference image 108.

The target image data 112 and the reference image data 114 are provided to the lighting transfer engine 124. At a high level, the lighting transfer engine is configured to transfer a lighting effect from the reference image 108 to the target image 106. In this regard, the lighting in the target image 106 is edited to match the lighting in the reference image 108. The lighting transfer engine 124 utilizes the target image data 112 and the reference image data 114 to effectuate the lighting effect to the target image 106 such that the relit image 128 results. As described in more detail below, histogram matching can be used to transfer a lighting effect from the reference image 108 to the target image 106.

The graphical user interface (GUI) 126 of the graphics editor 102 facilitates a user of graphics editor 102 in performing an image relighting process. To accomplish this, GUI 126 can be configured to display relit image 128 to the user and to accept input from the user with respect to the relit image and/or input images (e.g., target image 106 and reference image 108). In embodiments, various input could be selection of a reference image having a lighting effect that the user would like to replicate in another image. Input may also be selection of a target image for which a lighting effect is desired to be applied. As an example, the user may utilize GUI 126, in conjunction with an input device (e.g., touch sensors, stylus, mouse, etc.), to identify a reference image(s) and/or target image(s).

Figure 2:
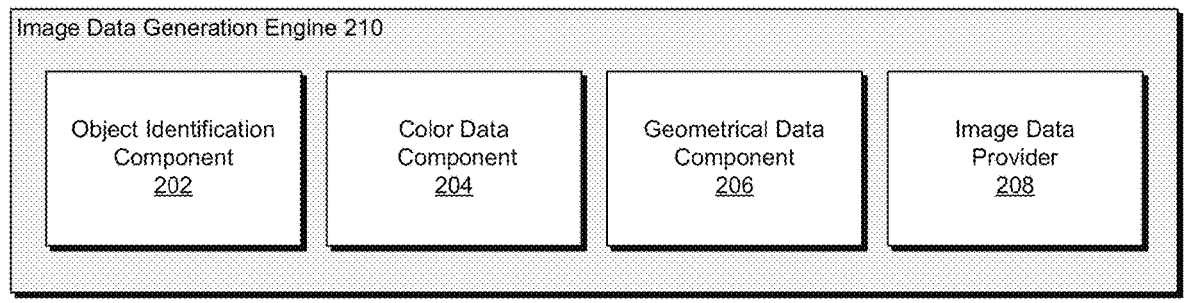
FIG. 2 depicts aspects of an illustrative lighting data generation engine, in accordance with various embodiments of the present disclosure.

Turning to FIG. 2, FIG. 2 provides an exemplary image data generation engine 210, in accordance with embodiments of the present invention. As described, the image data generation engine 210 generates, or obtains, image data associated with input images. To this end, the image data generation engine 210 generally generates color data and geometrical data associated with reference images and target images, or portions thereof (e.g., three-dimensional models or objects, such as a face).

As shown in FIG. 2, the image data generation engine 210 can include an object identification component 202, a color data component 204, a geometrical data component 206, and an image data provider 208. While illustrated as separate components in FIG. 2, it can be appreciated that the functionality can be performed via any number of components.

Figure 3:
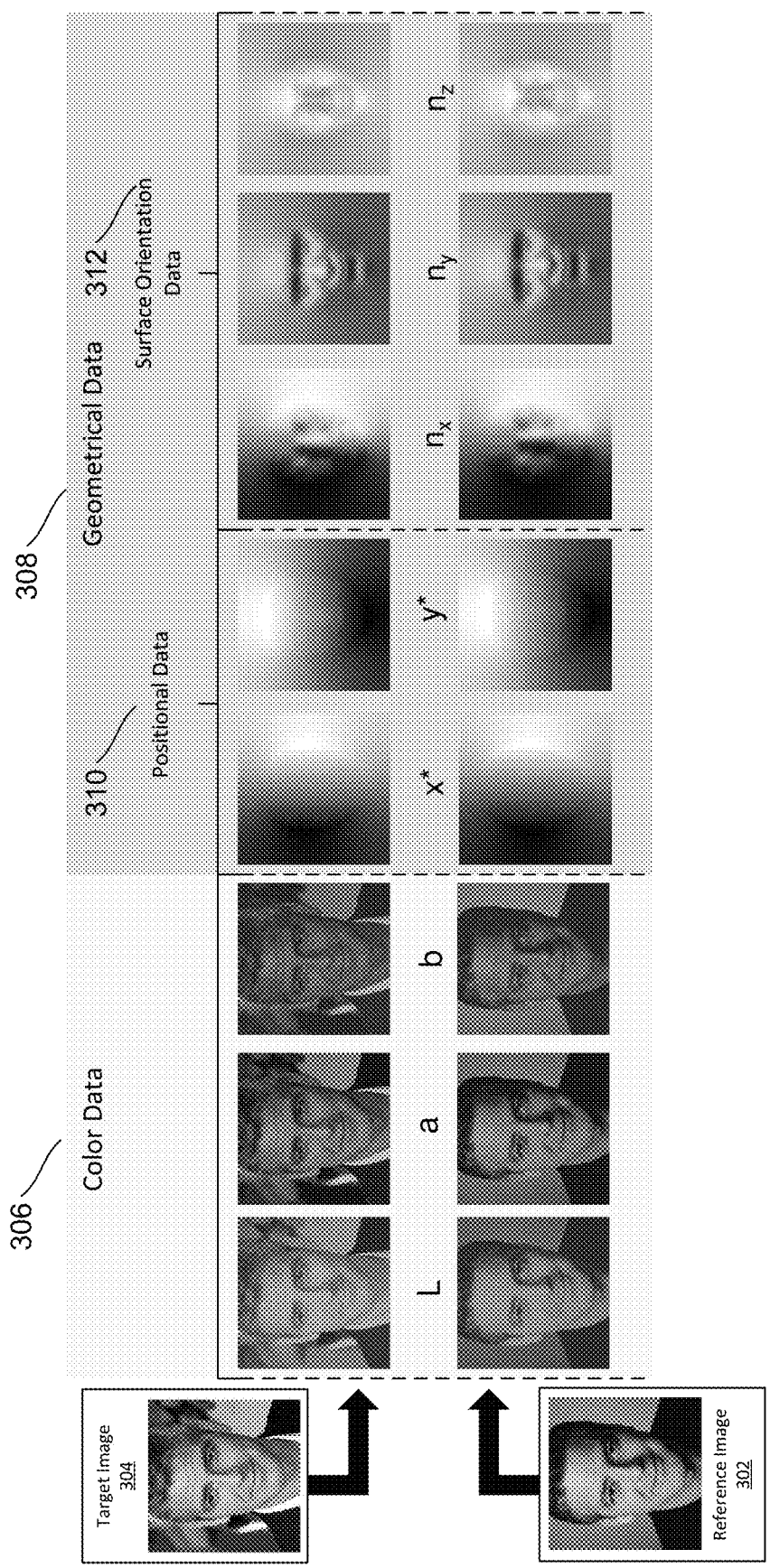
FIG. 3 illustrates a multi-dimensional image data generated for input images, in accordance with an embodiment of the present invention.

Initially, the object identification component 202 identifies or detects objects in images. In embodiments, an object(s) might be identified for use in performing a relighting effect. For instance, a salient portion of the image may be identified as an object for relighting. In some cases, a particular object might be identified in an image, for example, due to enhanced three-dimensional aspects. Such objects identified may be, for instance, facial regions within images. By way of example only, as illustrated in FIG. 3, surface orientation data 312, or surface normals, are more defined in the facial region.

Upon identifying an object in an image, such as a facial region, a three-dimensional model, or mesh, is fit to the object in the image (e.g., the reference image and/or the target image). In particular, a three-dimensional model is matched to the identified object, such as a facial region. A three-dimensional model can be matched to an object in any manner. In accordance with one embodiment of the present invention, an object(s) landmark(s) is aligned. Stated differently, three-dimensional models are matched with object landmarks. An object landmark generally refers to an aspect or portion that can facilitate identification of a marker or feature of an object. For instance, when an object is a facial region, alignment of a three dimensional model to the eyes and mouth identified in an image may be performed. In aligning landmarks, in some cases, the three-dimensional model does not need to be perfectly aligned. In this regard, because three-dimensional data is used to drive a two-dimensional image based relighting algorithm, more alignment errors are acceptable.

As one mask fitting example, object landmarks, such as facial landmarks, can be localized, for instance, using Active Shape Model (ASM) (a facial feature localization method). Any number of feature points may be localized. The three-dimensional geometry of the object can be represented via a shape vector, such as $s=(x_1, y_1, z_1, \ldots, x_n, y_n, z_n)^T$ that contains X, Y, Z coordinates of its n vertices. A morphable object model (e.g., expounded in "A morphable model for the synthesis of 3d faces" by Blanz and Vetter) can be defined, for instance, using Principal Component Analysis (PCA) via a training dataset. In this way, a morphable face model-based algorithm can be used to fit a three-dimensional object template mesh to an image. A new shape can be generated from the PCA model as:

$$s_{new} = \bar{s} + \Sigma \beta_i v_i = \bar{s} + V \cdot \beta$$

The three-dimensional fitting is performed by varying the coefficients $\beta$ to minimize error between projections of a pre-defined landmark(s) on the three-dimensional object geometry, and the two-dimensional feature points detected by ASM.

Upon fitting a three-dimensional model to an image, or object therein, the image data generation engine 210 can generate color and geometrical data. To this end, the image data generation engine 210 generates or obtains a high dimensional space for both the reference image and the target image. In particular, the color data component 204 generates or obtains color data for pixels within the input images, and the geometrical data component 206 generates or obtains geometrical data for pixels within the input images.

The color data component 204 is configured to generate or obtain color data for pixels within input images (e.g., a reference image and a target image). Such input images can be stored digitally as a two-dimensional array of pixels that depict the object(s) or scene captured by the respective digital image. The pixels are generally assigned certain information, such as, for instance, color data. Color data refers to data indicating color associated with a pixel(s). The generation of such color information can include extracting a color for each pixel, or group of pixels, within the image. For example, in some embodiments, each pixel is assigned a value in the red, green, blue (RGB) color domain. The RGB color domain, also referred to in the art as the RGB color model, is an additive representation of a color. In the RGB color domain, each pixel would be assigned a color by assigning an amount of red, green, and blue to the respective pixel, hereinafter referred to as an RGB color value. The combination of this RGB color value represents the color of the pixel within the digital image. It will be appreciated that the RGB color domain is merely meant to be an example of a possible color domain and that the teachings of this disclosure could be applied to any color domain, or representation of color, without departing from the scope of this disclosure.

In some embodiments, the extracted color information can be converted to another color space. For instance, an RGB color value can be converted to a Lab color space by performing a color conversion. A Lab color space refers to a color-opponent space with dimension L for lightness and a and b for the color-opponent dimensions. Although RGB and Lab color spaces are generally described herein, other color spaces are suitable for operation of the present invention.

Color data can be identified for any number of pixels in an image. For example, in some embodiments, color data is identified for each pixel in an image. In other embodiments, color data is identified for each pixel corresponding with a particular three-dimensional mask or a particular object (e.g., a facial region).

The geometrical data component 206 is configured to generate or obtain geometrical data. Geometrical data indicates geometry associated with pixels within images (e.g., pixel position and orientation of surface associated with pixel location. Geometrical data can include position data and surface orientation data (e.g., surface normal data). Position data refers to a position or coordinate location of a pixel, such as an x and y coordinate. In this regard, an x and a y coordinate can be identified for pixels within images. In some embodiments, the coordinates are local coordinates, that is, measurement indices into a local coordinate system or space. For instance, local coordinates might be object-centric coordinates (e.g., face-centric coordinates). For example, a tip of a nose might be a 0 coordinate in a local coordinate system. In such a case, local coordinates might be derived or converted to, for instance, from a global coordinate system. Although described as coordinate data herein, any other data indication location of pixels can be used.

Surface orientation data associated with a pixel can be represented via normal data, or surface normal data. Normal data generally refers to data associated with an object, such as a line or vector, that is perpendicular to a given object (e.g., three-dimensional mask). With a three-dimensional mask, a surface normal, or normal, refers to a vector that is perpendicular to the tangent plane to a surface of the mask at a point, such as a pixel. The surface normal, or normal, indicates a direction in which the three-dimensional surface is facing. To this end, the surface orientation, or surface normal, indicates the three-dimensional orientation of the surface where a pixel is located.

Geometrical data, such as positional data and/or surface orientation data (e.g., surface normal data), can be identified for any number of pixels in an image. For example, in some embodiments, geometrical data is identified for each pixel in an image. In other embodiments, geometrical data is identified for each pixel corresponding with a particular object (e.g., a facial region or three-dimensional model associated therewith). For instance, geometrical data might be identified for a portion of pixels, for example, as such data may be well defined in a particular region, such as a model region associated with an object. To extend a lighting transfer effect beyond a particular region, such as a model region, geometrical data can be extrapolated for the pixels outside of the model region. By way of example only, surface normals can be identified in the region of a three-dimensional model fitted to a facial region in an image. Such normals can then be extrapolated in association with pixels outside of the facial region.

The image data provider 208 can provide image data, including the color data and the geometrical data, to a lighting transfer engine to effectuate a lighting transfer from a reference image to a target image. In some cases, the color data and geometrical data associated with a pixel can be provided as a feature vector. In this manner, a multi-dimensional feature vector can be constructed for a pixel that includes the color and geometrical data. In some cases, the multi-dimensional feature vector associated with a pixel can be an 8-dimensional space that includes color data of L, a, and b as well as geometrical data including coordinate data (e.g., x and y local coordinates) and normal values (e.g., $n_x$, $n_y$, and $n_z$). As described, in some cases, the multi-dimensional feature vector may include values that are derived from other values. For instance, geometrical data, such as coordinate data and normal data, for some pixels may be determined based on extrapolation from data gathered in association with a three-dimensional model fit to an object (e.g., a facial region).

By way of example only, and with reference to FIG. 3, FIG. 3 illustrates a multi-dimensional image data generated for input images, in accordance with an embodiment of the present invention. As illustrated in FIG. 3, a reference image 302 and a target image 304 are shown as input images. Multi-dimensional image data is generated for the reference image 302 and for the target image 304. In particular, color data 306 and geometrical data 308 can be generated for both the reference image 302 and the target image 304. The color data is represented by Lab color values. The geometrical data 308 includes positional data 310 (represented by local coordinates) and surface orientation 312 (represented by surface normals).

Although image data generally referred to herein as color data and geometrical data, image data may include other types of data that can be used for lighting transfer. By way of example only, other image data obtained may include user specified labels, semantic information, such as eyes, nose, mouth, etc. As can be appreciated, such image data can be identified and included in a multi-dimensional feature vector to facilitate a lighting transfer.

Figure 4:
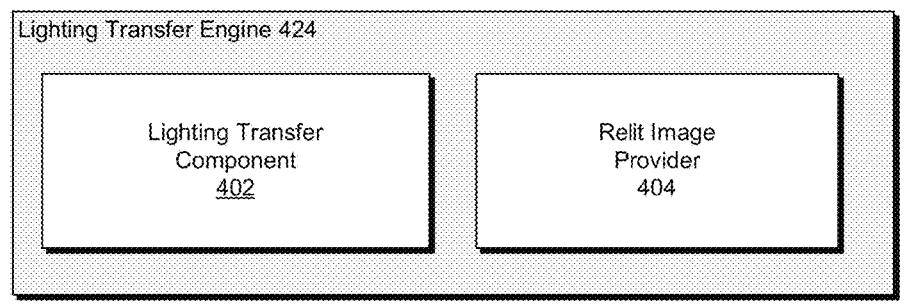
FIG. 4 depicts aspects of an illustrative lighting transfer engine, in accordance with various embodiments of the present disclosure.

Turning now to FIG. 4, FIG. 4 illustrates an exemplary lighting transfer engine 424, in accordance with embodiments of the present invention. As described, the lighting transfer engine 424 facilitates transfer of a lighting effect from a reference image to a target image. As shown in FIG. 4, the lighting transfer engine 424 can include a lighting transfer component 402 and a relit image provider 404. While illustrated as separate components in FIG. 4, it can be appreciated that the functionality can be performed via any number of components.

The lighting transfer component 402 is generally configured to transfer lighting to produce a relit image. In this regard, the lighting transfer component 402 can transfer lighting data from a reference image to a target image resulting in a relit image. As described, lighting data can be generated or identified based on image data associated with the reference and/or target image. For example, as described below, light can be transferred using histogram matching.

In one embodiment, a multi-dimensional histogram matching approach can be used to transfer lighting data to cause a lighting transfer from a reference image to a target image. As lighting has special effects related to three-dimensional geometry (e.g., shadow and shading), multi-dimensional histogram matching or transfer that incorporates geometrical data in the higher dimensional space can be used. To this end, a multi-dimensional histogram matching algorithm (e.g., expounded in "N-Dimensional Probability Density Function Transfer and its Application to Colour Transfer" by Pitie, Kokaram, and Dahyot) can be used to match the data or statistics of the multi-dimensional feature vectors associated with a target image and a reference image. Accordingly, the multi-dimensional histogram matching technique transfers lighting from one image to another taking into account the pixel colors as well as geometrical data, such as coordinates and normals. Application of a histogram transfer converts the target image to have the lighting effect of the reference image.

Generally, with histogram matching, a transfer function is computed between two images (e.g., a reference and target image), and the transfer function is then applied to an image (the target image) to effectuate a transfer of lighting or lighting data. In some embodiments, computation of the transfer function may utilize multi-dimensional image data associated with a three-dimensional model or a particular object (e.g., a facial region). For instance, a transfer function may be determined in association with a three-dimensional model based on a greater accuracy of geometric data associated therewith. Such a derived transfer function can then be applied to an entire image (e.g., the target image) to effectuate a lighting transfer across the image. Missing coordinate values and normal values can be extrapolated by solving a Poisson function to enforce smoothing transition on the three-dimensional mask boundary.

As one particular histogram matching example, multi-dimensional probability density function (PDF) transfer can be used to effectuate a lighting transfer from one image to another. One implementation of a multi-dimensional PDF transfer utilizes one-dimensional PDF matching in an iterative scheme through convergence. By way of example only, assume functions f(x) and g(y) denotes the PDF of X and Y, the reference and target multi-dimensional data, respectively. For instance, the samples $x_i$ of X encapsulate the color and position components, namely, $x_i=(L_i, a_i, b_i, x_i, y_i, n(x)_i, n(y)_i, n(z)_i)$. Such functions can be used to identify a mapping function, t, that transforms $f$ in g. In this regard, at iteration k, the samples are the iterated samples of $X^{(k)}$ (the target image) and the samples from Y (the reference image). Initially, for each iteration, the coordinate system can be modified by rotating both the samples of $X^{(k)}$ and the samples of Y. Thereafter, the samples of both distributions can be projected on a new axes, which provides marginal $f_1 \ldots f_N$ and $g_1 \ldots g_N$. Mappings $t_i$ that transfer the marginal from $f_i$ to $g_i$ can then be determined for each axis i. The resulting transformation t maps a sample $(x_1, \ldots, x_N)$ into $t(x_1 \ldots x_N)$. The iteration is then completed with a rotation of the samples by $R^{-1}$ to return to the original coordinate system. Such an iteration leaves the samples for g unchanged and transforms the PDF $f^{(k)}$ into $f^{(k+1)}$. When a number of iterations are repeated for sufficient different rotations, the algorithm converges $f^{(\infty)}=g$. Although multi-dimensional PDF transfer is described as one example to effectuate a lighting transfer, as can be appreciated, alternative methods may be used.

Various lighting transfer techniques may be employed in accordance with embodiments described herein. For example, as can be appreciated, in some embodiments, data or statistic smoothing can be used in an effort to avoid artifacts. To avoid artifacts in histogram matching, noise can be added to smooth the data or statistics to smooth the transfer function. For instance, in connection with histogram matching on images, small amounts of noise can be included in the color and geometrical data so that the lighting transfer is as smooth as possible.

In some cases, the color and geometrical data components can be weighted or scaled to emphasize or de-emphasize various aspects of the lighting transfer. As such, a scale can be applied to the color data, the positional data, and/or the surface orientation data, or portions thereof. The various assigned weights may be used to impact the effect of the lighting transfer. For instance, if a large weight is applied to surface normal data, the locality of the surface normal is essentially maintained. In this manner, the data or statistics get mapped from one to the other where the surface normals match. As another example, to mostly transfer lighting, then a low weight is assigned to color values (e.g., Lab).

The relit image provider 404 is configured to provide the relit image generated by the lighting transfer such that the relit image can be presented to a user, for example, via a graphical user interface. In some cases, the relit image provider 404 may perform post-processing to a relit image. For example, lighting transfer might be computed at a lower resolution and, thereafter, upsampled to the original scale. In particular, a gain can be computed on a larger scale (lower resolution) and, thereafter, upsampled to the original scale. Gain is used to generally refer to a multiplicative ratio.

Figure 5:
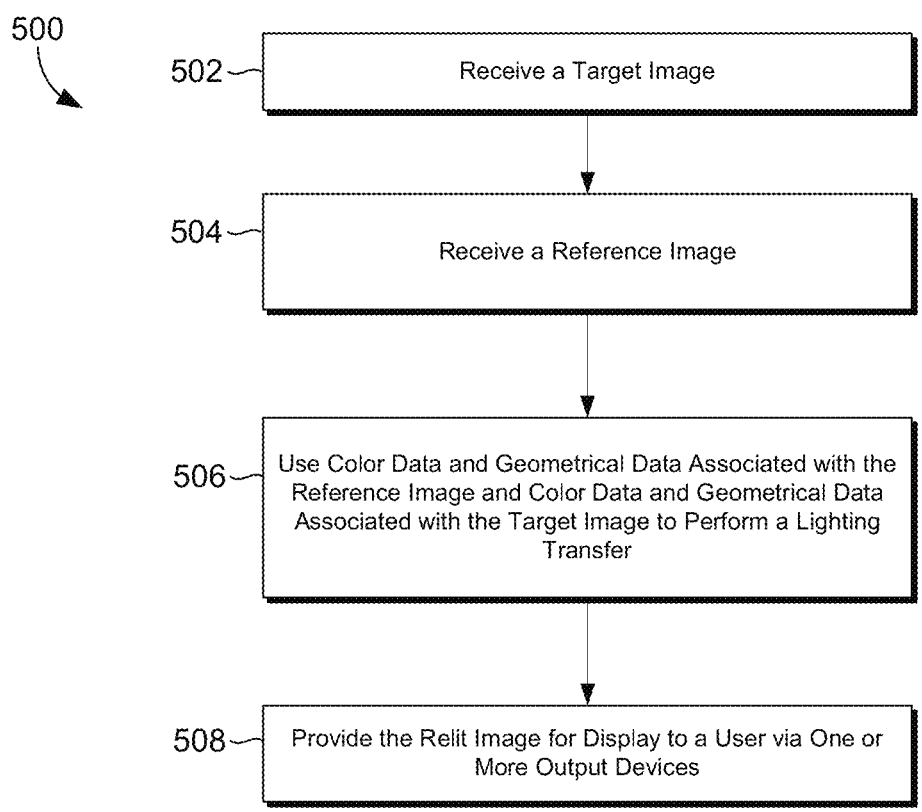
FIG. 5 illustrates a process flow depicting an example image lighting technique, in accordance with various embodiments of the present disclosure.

FIG. 5 illustrates a process flow 500 depicting an example image relighting technique, in accordance with various embodiments of the present disclosure. Process flow 500 could be carried out, for example by graphics editor 102 of FIG. 1. As depicted, process flow 500 can begin at block 502 at which a target image (e.g., target image 106 of FIG. 1) is received. At block 504, a reference image (e.g., reference image 108 of FIG. 1) is received. In embodiments, the target image and the reference image can be designated by a user. At block 506, a lighting transfer is performed using color data and geometrical data associated with the reference image and color data and geometrical data associated with the target image. In some embodiments, histogram matching can be used to perform a lighting transfer. The lighting transfer causes generation of a relit image that corresponds with the target image having a lighting effect of the reference image. At block 508, the relit image is provided for display to a user via one or more output devices.

Figure 6:
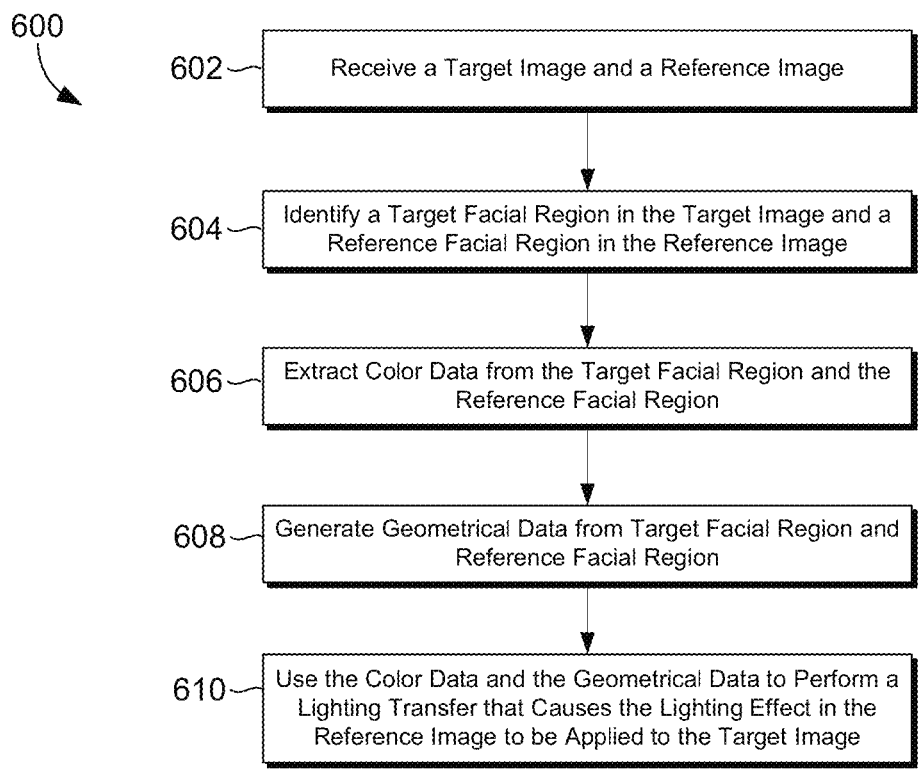
FIG. 6 illustrates a process flow depicting another example image lighting technique, in accordance with various embodiments of the present disclosure.

FIG. 6 illustrates a process flow 600 depicting an example image relighting technique, in accordance with various embodiments of the present disclosure. Process flow 600 could be carried out, for example by graphics editor 102 of FIG. 1. As depicted, process flow 600 can begin at block 602 at which a target image (e.g., target image 106 of FIG. 1) and a reference image (e.g., reference image 108 of FIG. 1) is received. At block 604, a target facial region in the target image and a reference facial region in the reference image are identified. In accordance with identifying facial regions, a three-dimensional model can be applied in such regions. At block 606, color data is extracted from the target facial region and the reference facial region. At block 608, geometrical information is generated from the target facial region and the reference facial region. Such geometrical information can include positional data and surface orientation data. For example, a three-dimensional model can be used to facilitate generation of geometrical information, such as surface normal. Subsequently, at block 610, the color data and the geometrical data are used to perform a lighting transfer that causes the lighting effect in the reference image to be applied to the target image.

Figure 7:
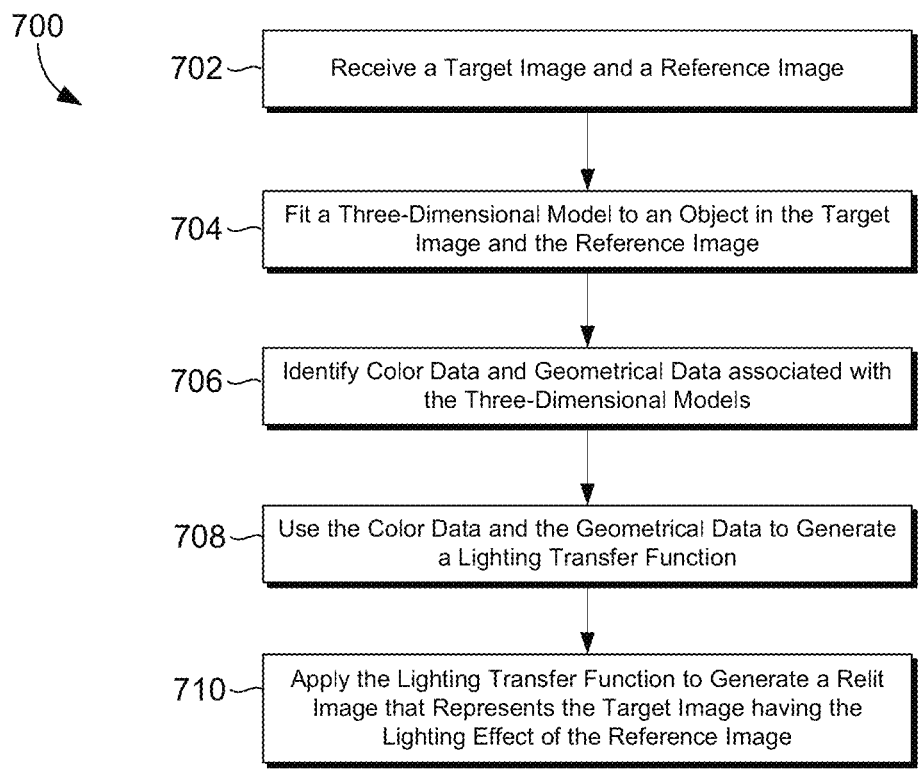
FIG. 7 illustrates a process flow depicting another example image lighting technique, in accordance with various embodiments of the present disclosure.

FIG. 7 illustrates a process flow 700 depicting an example image relighting technique, in accordance with various embodiments of the present disclosure. Process flow 700 could be carried out, for example by graphics editor 102 of FIG. 1. As depicted, process flow 700 can begin at block 702 at which a target image (e.g., target image 106 of FIG. 1) and a reference image (e.g., reference image 108 of FIG. 1) is received. At block 704, a three-dimensional model is fitted to an object in the target image, and a three-dimensional model is fitted to an object in the reference image. At block 706, color data and geometrical data are identified in accordance with the three-dimensional models. At block 708, the color data and geometrical data associated with the three-dimensional models are used to generate a lighting transfer function. For instance, a lighting transfer function may be generated using a histogram matching process. The lighting transfer function is applied to generate a relit image that represents the target image having the lighting effect of the reference image, as at block 710

Figure 8:
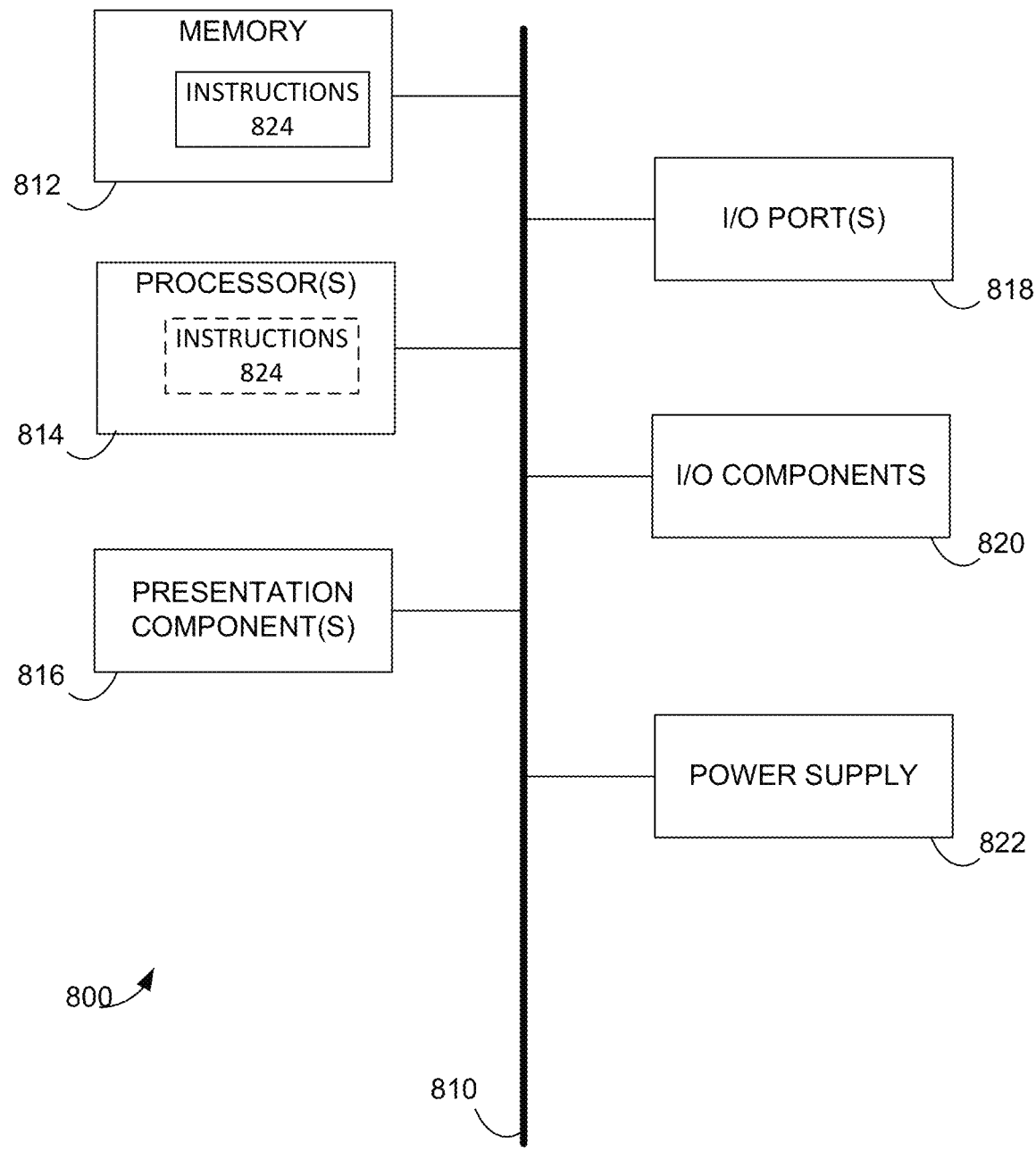
FIG. 8 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 8, an illustrative operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 8 is merely illustrative of an example computing device that can be used in connection with one or more embodiments of the present disclosure. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any modules, components, and/or engines described herein. The memory may be removable, non-removable, or a combination thereof. Illustrative hardware devices include solid-state memory, hard drives, optical-disc drives, etc. Computing device 800 includes one or more processors that read data from various entities such as memory 812 or I/O components 820. Presentation component(s) 816 present data indications to a user or other device. Illustrative presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure. It will be understood that certain features and sub-combinations are of utility and may be employed without reference to other features or sub-combinations. This is contemplated by and is within the scope of the claims.

What is claimed is:

1. One or more non-transitory computer-readable storage media having instructions stored thereon, which, when executed by one or more processors of a computing device, cause the computing device to perform actions comprising:
receiving a target image and a reference image, the reference image including a lighting effect desired to be applied to the target image;
employing a multi-dimensional histogram matching technique that applies a transfer function to the target image, wherein the transfer function comprises a probability density function and is based on a combination of color data and three-dimensional (3D) geometrical data associated with the reference image and a combination of color data and 3D geometrical data associated with the target image, and wherein applying the transfer function to the target image effectuates a lighting transfer that causes a geometry-based transfer of a lighting effect from the reference image to a relit image that corresponds with the target image, such that the relit image includes the lighting effect that was transferred from the reference image;
providing the relit image for display to a user via one or more output devices.

2. The one or more non-transitory computer-readable storage media of claim 1, wherein the actions further comprise:
generating the color data and geometrical data associated with the reference image.

3. The one or more non-transitory computer-readable storage media of claim 1, wherein the actions further comprise:
generating the color data and geometrical data associated with the target image.

4. The one or more non-transitory computer-readable storage media of claim 1, wherein the color data associated with the reference image and the color data associated with the target image comprises Lab color values.

5. The one or more non-transitory computer-readable storage media of claim 1, wherein the geometrical data associated with the reference image and the geometrical data associated with the target image comprises coordinate data and surface orientation data.

6. The one or more non-transitory computer-readable storage media of claim 1, wherein the reference image comprises a photograph, a three-dimensional rendered image, or a user-edited image.

7. The one or more non-transitory computer-readable storage media of claim 1, wherein the actions further comprise:
generating a multi-dimensional feature vector for the reference image that includes the color data and the geometrical data associated with the reference image;
generating a multi-dimensional feature vector for the target image that includes the color data and the geometrical data associated with the target image; and
matching the multi-dimensional feature vector for the reference image with the multi-dimensional feature vector for the target image to transfer the lighting.

8. One or more non-transitory computer-readable storage media having instructions stored thereon, which, when executed by one or more processors of a computing device, cause the computing device to perform actions comprising:
receiving a target image and a reference image, the reference image including a lighting effect desired to be applied to the target image;
generating reference image data for pixels of the reference image, the reference image data including reference three-dimensional (3D) geometrical data and reference color data for the respective pixels of the reference image;
generating target image data for pixels of the target image, the target image data including target 3D geometrical data and target color data for the respective pixels of the target image;
employing a multi-dimensional histogram matching technique that applies a transfer function to the target image, wherein the transfer function comprises a probability density function and is based on a combination of the reference color data and the reference 3D geometrical data associated with the reference image and a combination of the target color data and the target 3D geometrical data associated with the target image and wherein applying the transfer function to the target image effectuates a lighting transfer that causes a geometry-based transfer of a lighting effect from the reference image to a relit image that corresponds with the target image, such that the relit image includes the lighting effect that was transferred from the reference image; and
providing the relit image for display the target image that includes the lighting effect that was transformed from the reference image.

9. The one or more non-transitory computer-readable storage media of claim 8, wherein the reference image and the target image are input images designated by a user.

10. The one or more non-transitory computer-readable storage media of claim 8, wherein the reference color data and the target color data comprise Lab color values.

11. The one or more non-transitory computer-readable storage media of claim 8, wherein the reference 3D geometrical data and the target 3D geometrical data comprise coordinates and surface orientation data.

12. The one or more non-transitory computer-readable storage media of claim 11, wherein the coordinates comprise local coordinates.

13. The one or more non-transitory computer-readable storage media of claim 11, wherein the surface orientation data comprises surface normal data.

14. The one or more non-transitory computer-readable storage media of claim 8, wherein the actions further comprise:
generate multi-dimensional vectors associated with pixels in the reference image using the reference 3D geometrical data and the reference color data; and
generate multi-dimensional vectors associated with pixels in the target image using the target 3D geometrical data and the target color data.

15. The one or more non-transitory computer-readable storage media of claim 14, wherein the multi-dimensional vectors are used to perform the lighting transfer via multi-dimensional histogram matching.

16. A computer-implemented method for facilitating image relighting, the method comprising:
receiving a target image and a reference image, the reference image including a lighting effect desired to be applied to the target image;
generating reference image data for pixels of the reference image, the reference image data including reference three-dimensional (3D) geometrical data and reference color data for the respective pixels of the reference image;

generating target image data for pixels of the target image, the target image data including target 3D geometrical data and target color data for the respective pixels of the target image;

employing a multi-dimensional histogram matching technique that applies a transfer function to the target image, wherein the transfer function comprises a probability density function and is based on a combination of the reference color data and the reference 3D geometrical data associated with the reference image and a combination of the target color data and the target 3D geometrical data associated with the target image, and wherein applying of the transfer function to the target image effectuates a lighting transfer that causes a geometry-based transfer of a lighting effect from the reference image to a relit image that corresponds with the target image, such that the relit image includes the lighting effect that was transferred from the reference image; and outputting the target image to the user via one or more output devices.

17. The method of claim 16 further comprising fitting a three-dimensional model to an object in the target image and a three-dimensional model to an object in the reference image.

18. The method of claim 17 further comprising using the three-dimensional model fitted to the object in the target image to compute the target 3D geometrical data, the target 3D geometrical data comprising local coordinate data and surface normal data.

19. The method of claim 17 further comprising using the three-dimensional model fitted to the object in the reference image to compute the reference 3D geometrical data, the reference 3D geometrical data comprising local coordinate data and surface normal data.

* * * * *

UNITED STATES PATENT AND TRADEMARK OFFICE
CERTIFICATE OF CORRECTION

PATENT NO. : 10,521,892 B2
APPLICATION NO. : 15/253655
DATED : December 31, 2019
INVENTOR(S) : Kalyan K. Sunkavalli et al.

Page 1 of 1

It is certified that error appears in the above-identified patent and that said Letters Patent is hereby corrected as shown below:

In the Claims

In Column 15, Line 12 (approx.), Claim 16, before "the" delete "of".

Signed and Sealed this
Fourth Day of August, 2020

Andrei Iancu
*Director of the United States Patent and Trademark Office*